United States Patent
Yeh et al.

(10) Patent No.: US 10,438,139 B2
(45) Date of Patent: Oct. 8, 2019

(54) LAND BATTLE PROCESS EVALUATION METHOD AND SYSTEM THEREOF

(71) Applicant: NATIONAL TSING HUA UNIVERSITY, Hsinchu (TW)

(72) Inventors: Wei-Chang Yeh, Hsinchu (TW); Chih-Ming Lai, Taoyuan (TW)

(73) Assignee: NATIONAL TSING HUA UNIVERSITY, Hsinchu (TW)

(*) Notice: Subject to any disclaimer, the term of this patent is extended or adjusted under 35 U.S.C. 154(b) by 879 days.

(21) Appl. No.: 14/886,585

(22) Filed: Oct. 19, 2015

(65) Prior Publication Data
US 2017/0011007 A1    Jan. 12, 2017

(30) Foreign Application Priority Data
Jul. 8, 2015 (TW) .............................. 104122212 A

(51) Int. Cl.
*G06Q 10/04* (2012.01)
(52) U.S. Cl.
CPC .................................. *G06Q 10/04* (2013.01)
(58) Field of Classification Search
CPC .............................. G06F 17/16; G06Q 10/04

USPC ................................................. 1/1; 703/22
See application file for complete search history.

(56) References Cited

U.S. PATENT DOCUMENTS

| | | | |
|---|---|---|---|
| 6,209,873 B1* | 4/2001 | DeGeorge | A63F 3/00075 273/262 |
| 6,273,818 B1* | 8/2001 | Komoto | A63F 13/005 463/31 |
| 9,454,909 B1* | 9/2016 | Siddle | G09B 9/003 |
| 2014/0024445 A1* | 1/2014 | Aller | G07F 17/3225 463/29 |

* cited by examiner

*Primary Examiner* — Eunhee Kim
(74) *Attorney, Agent, or Firm* — Muncy, Geissler, Olds & Lowe, P.C.

(57) ABSTRACT

A land battle process evaluation method and system thereof are provided. The land battle result evaluation method includes a flow network for presenting the land battle process problem. The flow network includes a plurality of land nodes and a plurality of connection paths for connecting the plurality of land nodes. A source node and a sink node may be disposed in the plurality of land nodes. A plurality of attack paths are formed by a combination of the plurality of connection paths from the source node to the sink node. The actual process of the land battle is simulated by the flow network and the probability of the various attack plans are obtained, such that the practical command is provided by reference to the evaluation result.

8 Claims, 4 Drawing Sheets

LAND BATTLE PROCESS EVALUATION METHOD AND SYSTEM THEREOF

CROSS-REFERENCE TO RELATED APPLICATION

This application claims the benefit of Taiwan Patent Application No. 104122212, filed on Jul. 8, 2015, in the Taiwan Intellectual Property Office, the disclosure of which is incorporated herein in its entirety by reference.

BACKGROUND OF THE INVENTION

1. Field of the Invention

The present disclosure generally relates to a land battle process evaluation method and a system thereof, in particular to presenting military simulation of a land battle process through a multistate flow network and presenting troop losses through a degenerated flow network to evaluate a land battle process evaluation method and a system thereof.

2. Description of the Related Art

At present, when the military unit is performing the military simulation, the attack plans concerning both offense side and defense side are respectively arranged according to respective locations and amount of troops of the both sides. And the evaluation result is made according to the simulation of the land battle, casualties, and so on. Although the military simulation is evolved from the traditional practice method into computer simulation, both the offense side and the defense side depend on personal experience to make the decision. Such manner may cause the simulation not covering all the probabilities of the land battle process and results in the degradation of the military simulation and the deviation of the troop deployment due to the misjudgment of the situations.

In view of this, how to establish a land battle process evaluation method and a system thereof which are able to completely take the deployment of troop in the land battle process into account is in dire need towards the national defense unit or military unit, such that the comprehensiveness of the military simulation can be promoted. When establishing the model of military simulation in the land battle process, it can consider applying a flow network to simulate the battle, such as a multistate flow network. The nodes of the multistate flow network, which are of importance to both offense side and the defense side, are regarded as pivotal region and transport junction. The paths between the nodes are served as the potential attack path and correspond to the deployment of the battle. However, the conventional flow network is designed according to the flow conservation law, resulting that the input flow is equal to the output flow. The practical deployment and troop losses may differ from that of the conventional flow network. Consequently, the conventional flow network designed according to the flow conservation law cannot be applied to the simulation of the land battle process perfectly.

As a result, the inventor of the present disclosure has been mulling the technical problems over and then therefore designs a land battle process evaluation method and a system thereof which aim to resolve the existing shortcomings, so as to promote the industrial practicability.

SUMMARY OF THE INVENTION

In view of the aforementioned technical problems, one objective of the present disclosure is to provide a land battle process evaluation method and a system thereof which aim to resolve the technical problem regarding that the conventional military simulation is incapable of simulating all the deployment with respect to both offense side and defense side.

According to one objective of the present disclosure, it provides land battle process evaluation method which may include a flow network stored in a memory for presenting a land battle process problem, the flow network including a plurality of land nodes and a plurality of connection paths for connecting the plurality of land nodes, a source node and a sink node disposed in the plurality of land nodes, a plurality of attack paths formed by a combination of the plurality of connection paths from the source node to the sink node, and the method which may include the following steps: setting an attack troop starting from the source node and a lower boundary number of the attack troop for successfully occupying the sink node by an input device; setting an attack troop starting from the source node and a lower boundary number of the attack troop for successfully occupying the sink node by an input device; accessing the flow network stored in the memory to respectively obtain troop flows which are accommodated in the plurality of connection paths and calculating a maximal troop flow passing through the plurality of attack paths by a processor; producing a plurality of troop flow vectors by the processor, the plurality of troop flow vectors including a troop amount passing the plurality of attack paths, and the plurality of troop flow vectors not exceeding in the maximal troop flow; combining the plurality of troop flow vectors to produce a plurality of attack plans by the processor and the plurality of attack plans including different deployments of the attack troop passing through the plurality of attack paths; calculating troop losses of the plurality of troop flow vectors in the plurality of land nodes by the processor, an amount of the troop losses indicating an amount of casualties in the attack path; calculating a remaining troop by subtracting the troop losses from the attack troop through the processor and comparing the remaining troop with the lower boundary number to obtain an occupation probability from each of the plurality of attack plans for occupying a land successfully and storing the occupation probability in the memory, and choosing the attack plan corresponding to an optimal occupation probability by the processor and transmitting the attack plan to a combat command center server by an output device, and the combat command center server releasing a battle command to deploy a practical attack troop and route according to the attack plan.

Preferably, the troop losses may be calculated according to a probability with respect to casualties caused in the plurality of land nodes.

Preferably, the plurality of attack plans respectively may include a battle plan weight, and the occupation probability and the battle plan weight may be combined to calculate an expected outcome of the land battle process.

Preferably, the land battle process evaluation method may further include the flowing step: deleting one of the plurality of land nodes and correcting the flow network in the memory and reassessing the occupation probability of the plurality of attack plans, so as to evaluate the land node having a maximal influence on the flow network by comparing results of deleting different nodes.

Preferably, the land battle process evaluation method may further include the flowing step: transmitting the land node having the maximal influence on the combat command center server by the output device through the processor, and the combat command center server releasing a defense command to deploy a defense troop in each land node according to the land node having the maximal influence.

According to another objective of the present disclosure, it provides a land battle process evaluation system which may include a flow network stored in a memory for presenting a land battle process problem, the flow network including a plurality of land nodes and a plurality of connection paths for connecting the plurality of land nodes, a source node and a sink node disposed in the plurality of land nodes, a plurality of attack paths formed by a combination of the plurality of connection paths from the source node to the sink node, and the system including an input device setting an attack troop starting from a source node and a lower boundary number of the attack troop for successfully occupying the sink node; a memory storing the flow network and an algorithm, and the algorithm comprising the following steps: respectively obtaining troop flows which are accommodated in the plurality of connection paths and calculating a maximal troop flow passing through the plurality of attack paths; producing a plurality of troop flow vectors by the processor, the plurality of troop flow vectors indicating a troop amount passing the plurality of attack paths, and the plurality of troop flow vectors not exceeding in the maximal troop flow; combining the plurality of troop flow vectors to produce a plurality of attack plans and the plurality of attack plans including different deployments of the attack troop passing through the plurality of attack paths; calculating troop losses of the plurality of troop flow vectors in the plurality of land nodes, an amount of the troop losses including an amount of casualties in the attack path; calculating a remaining troop by subtracting the troop losses from the attack troop and comparing the remaining troop with the lower boundary number to obtain an occupation probability from each of the plurality of attack plans for occupying a land successfully and storing the occupation probability in the memory; a processor connected to the flow network and the memory executing the algorithm to obtain the occupation probability; and an output device connected to the memory choosing the attack plan corresponding to an optimal occupation probability and the attack plan being transmitted to a combat command center server by the output device, and the combat command center server releasing a battle command to deploy a practical attack troop and route according to the attack plan.

Preferably, the troop losses may be calculated according to a probability with respect to casualties caused in the plurality of land nodes.

Preferably, the plurality of attack plans respectively may include a battle plan weight, and the occupation probability and the battle plan weight may be combined to calculate an expected outcome of the land battle process.

Preferably, the algorithm may further include the following step: deleting one of the plurality of land nodes and correcting the flow network in the memory and reassessing the occupation probability of the plurality of attack plans, so as to evaluate the land node having a maximal influence on the flow network by comparing results of deleting different nodes.

Preferably, the algorithm may further include the following step: transmitting the land node having the maximal influence on the combat command center server by the output device through the processor, and the combat command center server releasing a defense command to deploy a defense troop in each land node according to the land node having the maximal influence.

As mentioned previously, a land battle process evaluation method and a system thereof of the present disclosure may have one or more advantages as follows.

1. The land battle process evaluation method and the system thereof of the present disclosure are able to present the practical situation of military simulation in the land battle process through the flow network model. By simulating all the offenses and defenses is able to obtain more precise evaluation result of the land battle.

2. The land battle process evaluation method and the system thereof of the present disclosure are able to apply the military simulation performed by the flow network to be calculated by a processor, such that the calculation efficiency is able to be promoted and the success probability of the land battle process derived from the specific calculation rule can be served as the evaluation result for predicting the outcome of the land battle.

3. The land battle process evaluation method and the system thereof of the present disclosure are able to release the command with respect to both the offense side and the defense side by referring to the evaluation result of the flow network, so as to avoid the unnecessary deployment of the troop.

DETAILED DESCRIPTION OF THE PREFERRED EMBODIMENTS

In order to facilitate the understanding of the technical features, the contents and the advantages of the present disclosure, and the effectiveness thereof that can be achieved, the present disclosure will be illustrated in detail below through embodiments with reference to the accompanying drawings. On the other hand, the diagrams used herein are merely intended to be schematic and auxiliary to the specification, but are not necessary to be true scale and precise configuration after implementing the present disclosure. Thus, it should not be interpreted in accordance with the scale and the configuration of the accompanying drawings to limit the scope of the present disclosure on the practical implementation.

In accordance with the embodiment(s) of the present disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Figure 1:
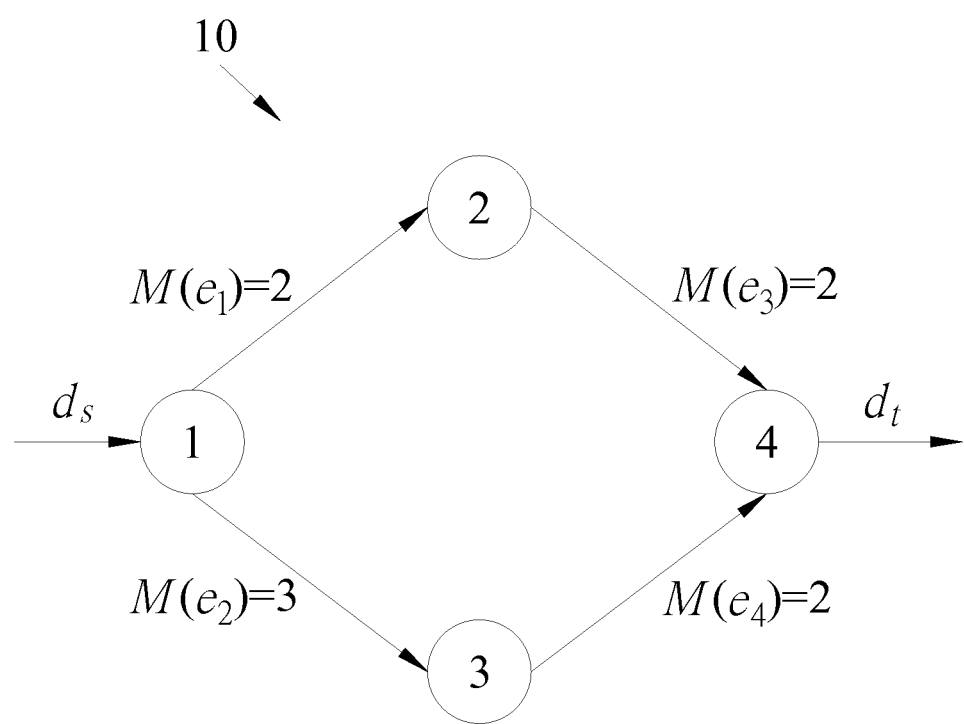
FIG. 1 is a schematic diagram of a multi-state flow network of the present disclosure.

Please refer to FIG. 1 which a schematic diagram of a multi-state flow network of the present disclosure. A flow network 10 is applied to indicate the various states of the flow network by G (V,E,C,U). Here, V={1, 2, . . . , n} indicates a node set, n is an amount of the nodes, and each of the nodes represents a pivotal military node or a transport junction of the land battle for facilitating the defender to make defense, interception, and so on. These land nodes are disposed with a source node and a sink node. Node 1 is the source node of a flow network 10, and node n is a sink node of the flow network 10. Take FIG. 1 for example, the flow network 10 includes four nodes, and thus, n=4. The source node is the node 1 which means the location where the attacker enters firstly in the battle. The sink node is the node 4 which is regarded as the location where the defender holds. $E=\{e_1, e_2, \ldots, e_m\}$ is a path set of the flow network 10, m is an amount of the paths. As shown in FIG. 1, the flow network 10 has 4 paths which are respectively a path $e_1$ from the node 1 to the node 2, a path $e_2$ from the node 1 to the node 3, a path $e_3$ from the node 2 to the node 4 and a path $e_4$ from the node 3 to the node 4. The paths indicate attack paths where the attacker may possibly make attack. Here, as the flow network 10 is to simulate the attack and defense in the land battle, there is no reverse direction in choosing the attack paths. Besides, in order to evaluate probability of occupying the sink node, setting the attack paths MP=($P_1$, $P_2$, . . . , $P_p$) as a set including all the possible paths starting from the source node to the sink node, that is, a minimal path. In the embodiment of the present disclosure, the attack path MP of the flow network 10 includes $P_1$ {1, 2, 4} and $P_2$ {1, 3, 4}, meaning that the attack has to pass through the two aforementioned paths so as to arrive at a target of the sink node. Afterwards, $C=(c_1, c_2, \ldots, c_n)$ and $U=(u_1, u_2, \ldots, u_m)$ respectively indicate the defense capacity of $n^{th}$ node and the maximal transport capacity of $m^{th}$ path. Because the defender deploys in the pivotal nodes, and when the attacker passes through the nodes, the battle causes the troop losses. $c_n$ indicates the troop losses in the $n^{th}$ node when battling. The maximal transport capacity is to limit the amount of the troop which passes this path, simulating the amount of the troop which is allowed to march on the road in the real battle. As shown in the figure, $M(e_m)$ respectively indicates the maximal transport capacity of each path $e_m$ where the troop can pass through. Hence, if U=(2, 3, 2, 2), $M(e_1)$=2 indicates the maximal amount of the path $e_1$ that allows the troop passes through. The rest may be deduced by analogy. In addition, as the attack path is consisted of a plurality of paths, the maximal troop flow of the attack path is selected by the minimal value of the maximal transport capacity in all the paths. For example, in the attack path $P_2$ {1, 3, 4}, the maximal transport capacity of the path $e_2$ and path $e_4$ are respectively 3 and 2. As a result, the minimal value 2 is served as the maximal troop flow.

The establishment of the aforementioned flow network 10 can simulate the relationship among the nodes. The network nodes indicate the lands and the connected paths are regarded as the attack paths. According to the given flow, all the possible attack paths from the source node to the sink node can be found through the flow network. Thus, if the amount of input flow $d_s$ is served as the attack troop, the output flow $d_t$ is regarded as the final node of the flow network which has been successfully occupied by the attack troop when the output flow $d_t$ outflows from the sink node. To the contrary, if the flow fails to reach to the sink node or only the flow with the output flow $d_t$ below a predetermined amount, the defense works effectively. In the flow network, attack troop deployed in each attack path and the defense capacity in each node both vary with different situations, so that all probabilities between the attack and the defense can be taken into consideration by the flow network to obtain the optimal land battle process evaluation. The land battle process evaluation method is explained as follows.

Figure 2:
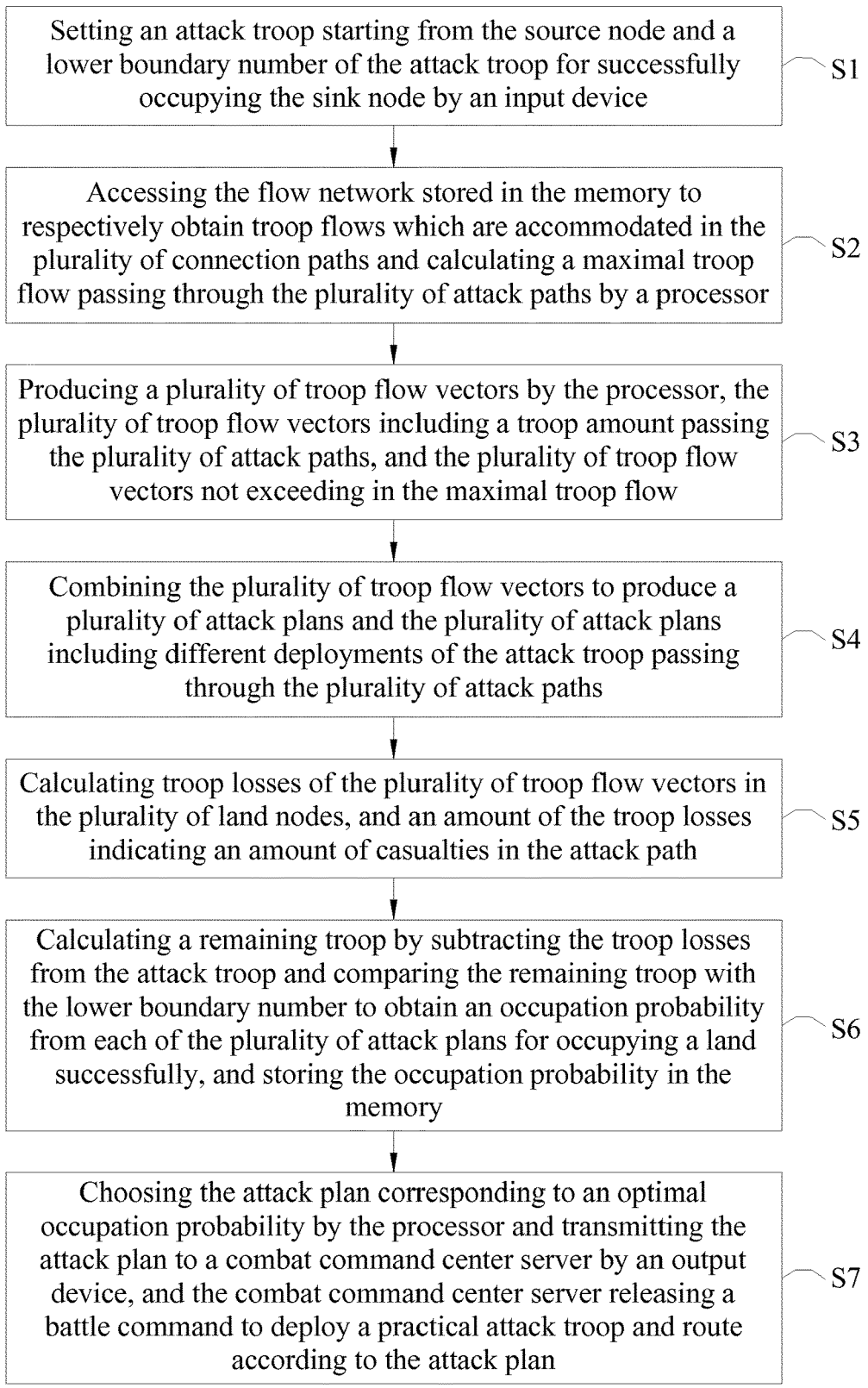
FIG. 2 is a flow chart of a land battle process evaluation method of the present disclosure.

Please refer to FIG. 2 which is a flow chart of a land battle process evaluation method of the present disclosure. As shown in the figure, the land battle process evaluation method includes the following steps (S1-S7).

Step S1: Setting an attack troop starting from the source node and a lower boundary number of the attack troop for successfully occupying the sink node by an input device. In addition to establishing the model of the flow network 1 shown in FIG. 1, when the user is evaluating the land battle process, the amounts of input flow $d_s$ and output flow $d_t$ are necessary, meaning to set an amount of the troop and a standard for the remaining troop of determining the final outcome of the battle. The input device used herein may include input interfaces such as keyboard, mouse, and touch screen and so on.

Step S2: Accessing the flow network stored in the memory to respectively obtain troop flows which are accommodated in the plurality of connection paths and calculating a maximal troop flow passing through the plurality of attack paths by a processor. The flow network stored in the memory is shown in FIG. 1. The path sets $E=\{e_1, e_2, e_3, e_4\}$ of the flow network respectively have a maximal transport capacity U=(2, 3, 2, 2), so the maximal troop flows of the attack paths $P_1\{1, 2, 4\}$ and $P_2 \{1, 3, 4\}$ are both 2. As the two paths have the same flow by 2, the maximal value of the input flow $d_s$ of the flow network is 4 as a sum of the flows of the two paths.

Step S3: Producing a plurality of troop flow vectors by the processor, the plurality of troop flow vectors including a troop amount passing the plurality of attack paths, and the plurality of troop flow vectors not exceeding in the maximal troop flow. As there are two attack paths $P_1$ and $P_2$, sets of the vector of the plurality of the troop flows $F=\{f_1, f_2\}$ and $f_1$, $f_2$ respectively indicate the troop amount of the two attack paths $P_1$ and $P_2$ which the input flow $d_s$ deploys. It can be found through the preceding step that a sum of $f_1$, $f_2$ is less than 4. Afterwards, the maximal troop flows of the two attack paths $P_1$ and $P_2$ are 2 respectively, the numerical value of $f_1$, $f_2$ is between 0 and 2.

Step S4: Combining the plurality of troop flow vectors to produce a plurality of attack plans and the plurality of attack plans including different deployments of the attack troop passing through the plurality of attack paths. For example, the step S1 is set the input flow $d_s$ to be 3, and the foregoing vector of the troop flow may be (1, 2) or (2, 1). The attack plan may include a first attack plan $F_1$(1, 2) and the second attack plan $F_2$(2, 1). The first attack plan $F_1$(1, 2) indicates adding 1 to the attack path $P_1$ {1, 2, 4} and adding 2 to the attack path $P_2$ {1, 3, 4}. If the input flow $d_s$ changes, it comes with the other combinations to cause different attack plans. By means of combining different probabilities to produce the corresponding attack plan is able to entirely evaluate all the possible situations, so as to analyze the potential of outcomes.

Step S5: Calculating troop losses of the plurality of troop flow vectors in the plurality of land nodes, and an amount of the troop losses indicating an amount of casualties in the attack path. In different attack plans, the troop deployed to the corresponding node is also different. In the two attack plans, the remaining troop $X=(x_1, x_2, \ldots, x_n)$ in the attack path is established. The remaining troop mentioned herein is the remainder of the troop losses in each node after the battle, and the remaining troop in each node varies with the deployed troop. In other words, when more defenders are deployed in the defense node, the vector F of the troop flow in the attack node may have more casualties while passing through the defense node, resulting in a higher probability of having less remainder of troop. Relatively, when the node is deployed with fewer troops, the vector F of the troop flow has a higher probability of maintaining the remaining troop or having minor troop casualties. The probability of how many troop left varies with the deployment of the defense.

Step S6: Calculating a remaining troop by subtracting the troop losses from the attack troop and comparing the remaining troop with the lower boundary number to obtain an occupation probability from each of the plurality of attack plans for occupying a land successfully, and storing the occupation probability in the memory. In the aforementioned steps, the calculation of the remaining troop in the attack path is to use the input flow $d_s$ and the remaining troop X to count up the probability of the input flow $d_s$ of the remaining troop X being capable of reaching to a predetermined amount. That is, the probability derived from the aforementioned step is used to calculate the probability of the remaining troop higher than the predetermined amount. So, the probability of the remaining troop higher than the predetermined amount is served as the probability $R(d_s, d_r, j)$ of evaluating whether the attack plan is able to occupy the land successfully. When $R(d_s, d_r, j)$ indicates the $j^{th}$ attack plan, the input flow $d_s$ satisfies with the probability. As stated in the foregoing steps, if the predetermined input flow $d_s$ for occupying the land successfully is 1, the occupation probabilities $R(3, 1, 1)$ and $R(3, 1, 2)$ are respectively calculated to be stored in the memory.

Step S7: Choosing the attack plan corresponding to an optimal occupation probability by the processor and transmitting the attack plan to a combat command center server by an output device, and the combat command center server releasing a battle command to deploy a practical attack troop and route according to the attack plan. By means of determining the stored occupation probabilities $R(3, 1, 1)$ and $R(3, 1, 2)$ to decide which attack plan is executed has a higher probability to win the land battle. If $R(3, 1, 1)$ is greater than $R(3, 1, 2)$, the first attack plan $F_1(1, 2)$ is transmitted to the combat command center server by the output device. Here, the output device may include LCD or LED displayer and the optimal attack plan is displayed through the screen of the display. Alternatively, the output device may be cable or wireless network transmitter which is applied to transmit the first attack plan to the combat command center server. When the defense command system received the optimal attack plan, the combat command corresponding to the optimal attack plan is transmitted to the command unit in the frontline to enable the attack troop with amount of 1 attacking from the attack path $P_1$ and the attack troop with amount of 2 staring from the attack path $P_2$, so as to have a higher probability to win the land battle.

In the foregoing land battle process evaluation method, the operator is able to provide different battle plan weights according to the experience or the previous battle outcome. For example, when considering the arrangement of the current resource, the first attack plan $F_1(1, 2)$ may need less time or amount of the deployment, so that the battle plan weight is promoted. When the success probability of each attack plan derived from the land battle process evaluation method is added to the set weight, it can obtain the success probability of the whole flow network battle, namely, the expected success probability of the land battle.

Besides, the sensitivity of each node can be analyzed by modifying the flow network model in the memory in the land battle process evaluation method. The operator deletes sequentially the land nodes in the flow network and then deletes the paths corresponding to the land nodes. After repeating the foregoing evaluation steps, it can obtain a new occupation probability or a probability of winning the battle. Afterwards, it can compare the different evaluation results caused by deleting different land nodes to find out the land node which has the most significant influence upon the entire flow network. As far as the defender is concerned, if there is a specific land node which does have the most significant influence upon the entire flow network, deploying more troop in the land node may have a probability to avoid it being occupied by the invader. In other words, as stated in the step S7, the important land node information may be transmitted to the combat command center server by the output device. After the information is received, the combat command center server release a defense command to that land node, such as deploying troop from the other land nodes to this land node, so as to promote the defense capacity of the land node and the entire territory.

Figure 3:
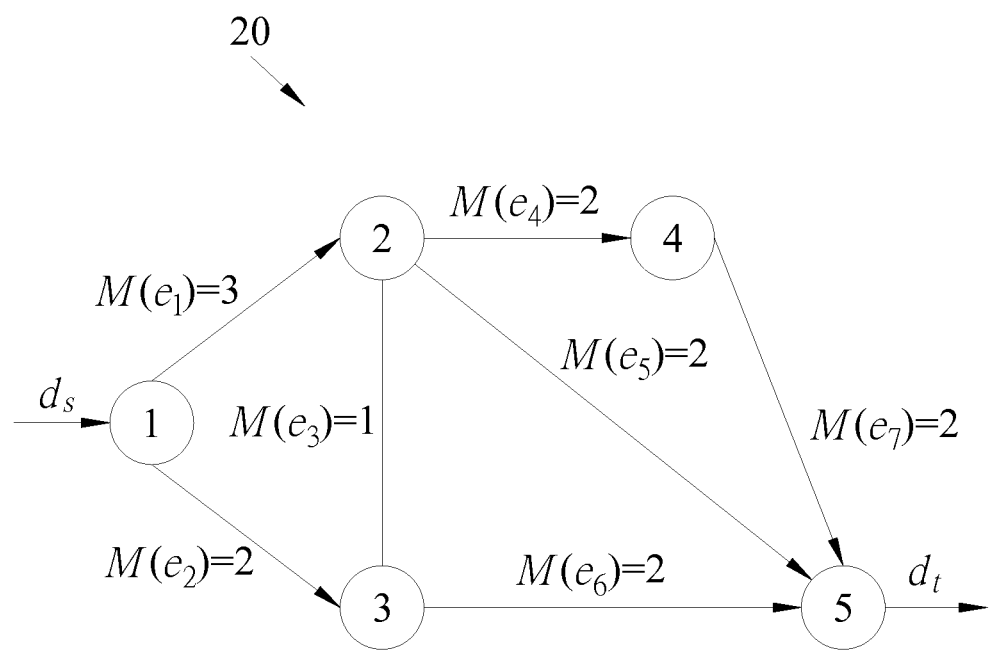
FIG. 3 is a schematic diagram of an embodiment of a land battle process of the present disclosure.

Please refer to FIG. 3 which is a schematic diagram of an embodiment of a land battle process of the present disclosure. As shown in the figure, the flow network 20 displays the diversity of the flow network by G(V,E,C,U). The flow network 20 includes 5 land nodes V={1, 2, 3, 4, 5}, the source node is 1, the sink node is 5, 7 paths, and E={$e_1$, $e_2$, $e_3$, $e_4$, $e_5$, $e_6$, $e_7$}. The defense capacity corresponding to each node is C=($c_1$, $c_2$, $c_3$, $c_4$, $c_5$)=(1, 1, 1, 2, 2). The transport capacity corresponding to each path is U=($u_1$, $u_2$, $u_3$, $u_4$, $u_5$, $u_6$, $u_7$)=(3, 2, 1, 2, 2, 2, 2). The attack paths of the flow network 20 are respectively $P_1$ {1, 2, 4, 5}, $P_2$ {1, 2, 5}, $P_1$ {1, 2, 3, 5} and $P_1$ {1, 3, 5}. The description with respect to the flow network in the embodiment is the same as that stated in the embodiment of FIG. 1, and the unnecessary details are no longer given herein.

After the model of the flow network 20 shown in FIG. 3 is established, the analysis of the land battle process evaluation is also performed and includes the following steps (S1-S7).

Step S1: inputting an input flow $d_s$ from a source node and an output flow $d_t$ to sink node. In this embodiment, the input quantity is set to be 5 and the output quantity is set to be 1. That is, if the amount of the input flow network is over 1, it means that the land node is occupied successfully.

Step S2: Obtaining the maximal transport capacity U=(3, 2, 1, 2, 2, 2, 2) of each path, calculating the maximal troop flow which is capable of passing through the attack paths $P_1$~$P_4$. L={$L_1$, $L_2$, $L_3$, $L_4$}, $L_1$=min {$u_1$, $u_4$, $u_7$}=2, $L_2$=min {$u_1$, $u_5$}=2, $L_3$=min {$u_1$, $u_3$, $u_6$}=1, $L_4$=min {$u_2$, $u_6$}=2, and L=(2, 2, 1, 2).

Step S3: producing a troop flow vector F={$f_1$, $f_2$, $f_3$, $f_4$}. As the troop flow vector has to satisfy with the input flow $d_s$ by 5, each of the flow vectors cannot exceed in the maximal troop flow L=(2, 2, 1, 2) which is capable of passing through the attack paths $P_1$~$P_4$. Besides, it has to satisfy with the maximal transport capacity U=(3, 2, 1, 2, 2, 2, 2) of each path. As a result, the troop flow vector F can be (1, 2, 0, 2) or (2, 1, 0, 2) after calculating.

Step S4: By satisfying with the aforementioned conditions to produce two sets of troop flow vectors F, it can therefore obtain two attack plans $F_1(1, 2, 0, 2)$ and $F_2(2, 1, 0, 2)$.

Step S5: calculating the two attack plans $F_1(1, 2, 0, 2)$ and $F_2(2, 1, 0, 2)$, adding the troop losses caused in each land node, and setting C=(1, 1, 1, 2, 2). The distribution of the probability of the defense capacity in each node can be referred to table 1.

TABLE 1

| Node | Defense capacity | Probability |
|---|---|---|
| 1 | 1 | 0.70 |
|   | 0 | 0.30 |
| 2 | 1 | 0.60 |
|   | 0 | 0.40 |
| 3 | 1 | 0.65 |
|   | 0 | 0.35 |
| 4 | 2 | 0.20 |
|   | 1 | 0.60 |
|   | 0 | 0.20 |
| 5 | 2 | 0.60 |
|   | 1 | 0.30 |
|   | 0 | 0.10 |

Step S6: By means of the set defense capacity to list all the possible outcomes happened in the node. The attack plan $F_1(1, 2, 0, 2)$ may include the probability as shown in table 2. The attack plan $F_2(2, 1, 0, 2)$ can be referred to such manner as well.

TABLE 2

| $F_j$ | $X_{j,k} = (x_1, x_2, x_3, x_4, x_5)$ |
|---|---|
| (1, 2, 0, 2) | $X_{1,1} = (0, 0, 1, 1, 2)$ |
|   | $X_{1,2} = (0, 1, 0, 1, 2)$ |
|   | $X_{1,3} = (0, 1, 1, 0, 2)$ |
|   | $X_{1,4} = (0, 1, 1, 1, 1)$ |
|   | $X_{1,5} = (1, 0, 0, 1, 2)$ |
|   | $X_{1,6} = (1, 0, 1, 0, 2)$ |
|   | $X_{1,7} = (1, 0, 1, 1, 1)$ |
|   | $X_{1,8} = (1, 1, 0, 0, 2)$ |
|   | $X_{1,9} = (1, 1, 0, 1, 1)$ |
|   | $X_{1,10} = (1, 1, 1, 0, 1)$ |
|   | $X_{1,11} = (1, 1, 1, 1, 0)$ |

It can calculate different probabilities according to table 1 and table 2. For example, $$Pr\{X_{1,1}\} = Pr\{X \geq (0, 0, 1, 1, 2)\}$$
$$= Pr\{x_1 \geq 0\} \times Pr\{x_2 \geq 0\} \times Pr\{x_3 \geq 1\} \times Pr\{x_4 \geq 1\} \times Pr\{x_5 \geq 2\}$$
$$= 1 \times 1 \times 0.65 \times 0.08 \times 0.60 = 0.3120$$

When each probability is obtain according to the relationship, it can be combined with all the probability values to obtain the occurrence probability of the attack plan $F_1(1, 2, 0, 2)$ according to the exclusion algorithm.

$$R(5, 1, 1) = \sum_{x \in F_1} Pr\{X\} = Pr\left\{\bigcup_{k=1}^{11} \{X \mid X \geq X_{1,k}\}\right\} = 0.5933,$$

$$R(5, 1, 2) = 0.7852$$

Step S7: The attack plan $F_2(2, 1, 0, 2)$ which has the optimal occupation is chosen and transmitted to the combat command center server by the output device, and then the combat command center server release the offense command to deploy the practical attack troop and route according to the deployment of the troop flow vector.

Furthermore, the weight of the occurrence probability of the attack plan $F_1$ may be set to be 0.7, and that of the attack plan $F_2$ may be set to be 0.3. The weight multiplies the occurrence probability to obtain the occurrence probability of the entire flow network R(5, 1)=0.7×0.5933+0.3×0.7852=0.6509 for being served as the success probability of the land battle.

Besides, the sensitivity of each node can be analyzed by modifying the flow network model in the memory in the land battle process evaluation method. The operator deletes sequentially the land nodes 1-5 in the flow network and simultaneously deletes the paths corresponding to the land nodes 1-5. After repeating the evaluation steps, a new occupation probability or success probability is obtained. Afterwards, the following formula (1) is applied to calculate the system reliability to obtain result as shown in table 3.

$$\sum_{k=1}^{\delta} Pr(X_{j,k}) - \sum_{h=2}^{\delta} \sum_{k=1}^{h-1} Pr(X_{j,k} \cap X_{j,h}) + \qquad (1)$$
$$\sum_{h=3}^{\delta} \sum_{k=2}^{h-1} \sum_{l=1}^{k-1} Pr(X_{j,k} \cap X_{j,k} \cap X_{j,l}) + \ldots + (-1)^{\delta-1} Pr(X_{j,l} \cap \ldots \cap X_{j,\delta})$$

As shown in table 3, it can be found that when deleting the land node 5, the entire system reliability decreases apparently. As a result, the land node 5 is regarded as the most important location to the defense side and increasing the defense capacity of this node has a higher probability of being occupied successfully. Moreover, transmitting this information to the combat command center server by the output device and then the combat command center server releasing the command of increasing the defense capacity of the node to increase the defense capacity to this node is able to promote the success probability of protecting the territory.

TABLE 3

| | The system reliability | | | |
|---|---|---|---|---|
| Node | $F_1$ | $F_2$ | All scenarios | Priority |
| 1 | 0.4266 | 0.6060 | 0.4804 | 2 |
| 2 | 0.4587 | 0.6415 | 0.5135 | 5 |
| 3 | 0.4428 | 0.6240 | 0.4972 | 3 |
| 4 | 0.5133 | 0.5133 | 0.5133 | 4 |
| 5 | 0.1638 | 0.3076 | 0.2069 | 1 |

Figure 4:
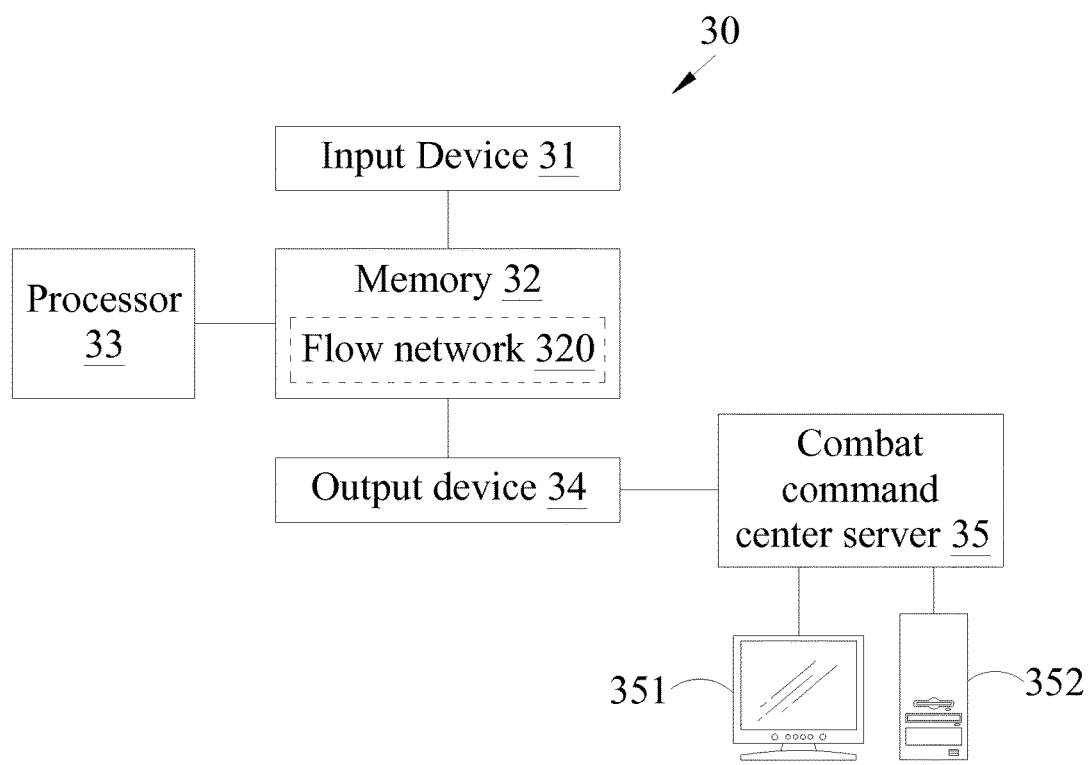
FIG. 4 is a schematic diagram of a land battle process evaluation system of the present disclosure.

Please refer to FIG. 4 which is a schematic diagram of a land battle process evaluation system of the present disclosure. As shown in the figure, a land battle process evaluation system 30 of the present disclosure includes an input device 31, a memory 32, a processor 33 and an output device 34. The input device 31 is connected to the memory 32 and includes various induction type or touch type interfaces. An input flow and an output flow of a flow network 320 are set by the input device 31. The processor 33 is connected to the memory 32 to access the flow network 320 in the memory 32 to calculate the evaluation analysis as shown in FIG. 2. In practice, the processor 33 executes the algorithm stored in the memory 32 and uses the commands included in each step to calculate a success probability of each attack plan. The result derived from the memory 33 is outputted by the output device 34. The output device 34 may be a display which is applied to display the evaluation result. The output device 34 may be LCD, LED, OLED display screen or cable or wireless network transmitter and is able to transmit the evaluation result to a combat command center server 35 through the military network or the regular communication network. When the combat command center server 35 receiving the evaluation result, the command is released corresponding to the evaluation result and is transmitted to an offense side computer 351 or a defense side computer 352, and then both the offense side and the defense side can deploy the troop after the command is received, so as to promote the success probability.

While the means of specific embodiments in present disclosure has been described by reference drawings, numerous modifications and variations could be made thereto by those skilled in the art without departing from the scope and spirit of the invention set forth in the claims. The modifications and variations should in a range limited by the specification of the present disclosure.

What is claimed is:

1. A land battle process evaluation method, comprising a flow network stored in a memory for presenting a land battle process problem, the flow network comprising a plurality of land nodes and a plurality of connection paths for connecting the plurality of land nodes, a source node and a sink node disposed in the plurality of land nodes, a plurality of attack paths formed by a combination of the plurality of connection paths from the source node to the sink node, and the method comprising the following steps:

setting an attack troop starting from the source node and a lower boundary number of the attack troop for successfully occupying the sink node by an input device;

accessing the flow network stored in the memory to respectively obtain troop flows which are accommodated in the plurality of connection paths and calculating a maximal troop flow passing through the plurality of attack paths by a processor;

producing a plurality of troop flow vectors by the processor, the plurality of troop flow vectors comprising a troop amount passing the plurality of attack paths, and the plurality of troop flow vectors not exceeding in the maximal troop flow;

combining the plurality of troop flow vectors to produce a plurality of attack plans by the processor and the plurality of attack plans comprising different deployments of the attack troop passing through the plurality of attack paths;

calculating troop losses of the plurality of troop flow vectors in the plurality of land nodes by the processor, an amount of the troop losses indicating an amount of casualties in the attack path;

calculating a remaining troop by subtracting the troop losses from the attack troop through the processor and comparing the remaining troop with the lower boundary number to obtain an occupation probability from each of the plurality of attack plans for occupying a land successfully and storing the occupation probability in the memory, choosing the attack plan corresponding to an optimal occupation probability by the processor and transmitting the attack plan to a combat command center server by an output device, and the combat command center server releasing a battle command to deploy a practical attack troop and route according to the attack plan; and deleting one of the plurality of land nodes sequentially and correcting the flow network in the memory and reassessing the occupation probability of the plurality of attack plans, so as to evaluate the land node having a maximal influence on the flow network by comparing system reliabilities of deleting different nodes.

2. The land battle process evaluation method of claim 1, wherein the troop losses are calculated according to a probability with respect to casualties caused in the plurality of land nodes.

3. The land battle process evaluation method of claim 1, wherein the plurality of attack plans respectively comprise a battle plan weight, and the occupation probability and the battle plan weight are combined to calculate an expected outcome of the land battle process.

4. The land battle process evaluation method of claim 1, further comprising the following steps:

transmitting the land node having the maximal influence to the combat command center server by the output device through the processor, and the combat command center server releasing a defense command to deploy a defense troop in each land node according to the land node having the maximal influence.

5. A land battle process evaluation system, comprising a flow network stored in a memory for presenting a land battle process problem, the flow network comprising a plurality of land nodes and a plurality of connection paths for connecting the plurality of land nodes, a source node and a sink node disposed in the plurality of land nodes, a plurality of attack paths formed by a combination of the plurality of connection paths from the source node to the sink node, and the system comprising:

an input device setting an attack troop starting from the source node and a lower boundary number of the attack troop for successfully occupying the sink node;

a memory storing the flow network and an algorithm, and the algorithm comprising the following steps:

respectively obtaining troop flows which are accommodated in the plurality of connection paths and calculating a maximal troop flow passing through the plurality of attack paths;

producing a plurality of troop flow vectors by the processor, the plurality of troop flow vectors comprising a troop amount passing the plurality of attack paths, and the plurality of troop flow vectors not exceeding in the maximal troop flow;

combining the plurality of troop flow vectors to produce a plurality of attack plans and the plurality of attack plans comprising different deployments of the attack troop passing through the plurality of attack paths;

calculating troop losses of the plurality of troop flow vectors in the plurality of land nodes, and an amount of the troop losses indicating an amount of casualties in the attack path;

calculating a remaining troop by subtracting the troop losses from the attack troop and comparing the remaining troop with the lower boundary number to obtain an occupation probability from each of the plurality of attack plans for occupying a land successfully and storing the occupation probability in the memory;

deleting one of the plurality of land nodes sequentially and correcting the flow network in the memory and reassessing the occupation probability of the plurality of attack plans, so as to evaluate the land node having a maximal influence on the flow network by comparing system reliabilities of deleting different nodes;

a processor connected to the flow network and the memory executing the algorithm to obtain the occupation probability; and an output device connected to the memory choosing the attack plan corresponding to an optimal occupation probability, and the attack plan being transmitted to a combat command center server by the output device, the combat command center server releasing a battle command to deploy a practical attack troop and route according to the attack plan.

6. The land battle process evaluation system of claim 5, wherein the troop losses are calculated according to a probability with respect to casualties caused in the plurality of land nodes.

7. The land battle process evaluation system of claim 5, wherein the plurality of attack plans respectively comprise a battle plan weight, and the occupation probability and the battle plan weight are combined to calculate an expected outcome of the land battle process.

8. The land battle process evaluation system of claim 5, the algorithm further comprising the following steps:

transmitting the land node having the maximal influence on the combat command center server by the output device through the processor, and the combat command center server releasing a defense command to deploy a defense troop in each land node according to the land node having the maximal influence.

* * * * *